(12) United States Patent
Miyata

(10) Patent No.: US 8,985,563 B2
(45) Date of Patent: Mar. 24, 2015

(54) SEAT DAMPER

(71) Applicant: Showa Corporation, Gyodo-shi, Saitama (JP)

(72) Inventor: Hiroyuki Miyata, Hukuroi (JP)

(73) Assignee: Showa Corporation, Saitama (JP)

( * ) Notice: Subject to any disclaimer, the term of this patent is extended or adjusted under 35 U.S.C. 154(b) by 176 days.

(21) Appl. No.: 13/762,459

(22) Filed: Feb. 8, 2013

(65) Prior Publication Data
US 2014/0001684 A1  Jan. 2, 2014

(30) Foreign Application Priority Data

Jun. 29, 2012 (JP) ................................. 2012-146451

(51) Int. Cl.
*B62J 1/04* (2006.01)
*F16F 1/12* (2006.01)

(52) U.S. Cl.
CPC .... *B62J 1/04* (2013.01); *F16F 1/12* (2013.01); *F16F 1/121* (2013.01)
USPC .......................................................... 267/132

(58) Field of Classification Search
CPC ................ B62J 1/04; F16F 1/12; F16F 1/121
USPC ............... 267/131, 132, 133, 140.11, 140.12, 267/150; 248/560, 562, 565, 566, 636, 618; 293/208, 209, 195.1, 195.11, 215.15, 293/313, 314
See application file for complete search history.

(56) References Cited

U.S. PATENT DOCUMENTS

| | | | | |
|---|---|---|---|---|
| 2,347,093 A | * | 4/1944 | Faulhaber | 297/210 |
| 4,679,761 A | * | 7/1987 | Small | 248/609 |
| 4,828,080 A | * | 5/1989 | Locher | 188/300 |
| 4,893,796 A | * | 1/1990 | Hickman et al. | 267/136 |
| 4,991,412 A | * | 2/1991 | Bauer et al. | 68/23.1 |
| 5,702,093 A | * | 12/1997 | Liao | 267/132 |
| 5,803,443 A | * | 9/1998 | Chang | 267/221 |
| 6,076,794 A | * | 6/2000 | Pradel | 267/220 |
| 7,621,498 B2 | * | 11/2009 | Tang | 248/343 |
| 7,661,663 B2 | * | 2/2010 | Fritz et al. | 267/221 |
| D709,802 S | * | 7/2014 | Miyata | D12/119 |
| 2001/0026059 A1 | * | 10/2001 | Smith | 280/283 |
| 2003/0042702 A1 | * | 3/2003 | Chen | 280/283 |
| 2004/0046295 A1 | * | 3/2004 | Rechtien | 267/140.12 |
| 2005/0029842 A1 | * | 2/2005 | Martin et al. | 297/199 |

(Continued)

FOREIGN PATENT DOCUMENTS

GB    2157394 A  * 10/1985 ............. F16F 15/08

*Primary Examiner* — Robert A Siconolfi
*Assistant Examiner* — Charles Poon
(74) *Attorney, Agent, or Firm* — Babcock IP, PLLC

(57) ABSTRACT

A seat damper attached between a vehicle body and a seat in a seat suspension structure. The seat damper capable of allowing misalignment of mounting positions of mounting parts between the vehicle body side and the seat side, and being configured with reduced rigidity. The seat damper includes: a resilient member interposed between a vehicle body and a seat, supporting a load applied thereto; a seat-side bearing plate and a vehicle body-side bearing plate sandwiching the resilient member; a rod including a joint for pivotably coupling the rod to the seat-side bearing plate and a locking portion at the other end locking the rod to a lower face of the vehicle body-side bearing plate, with this joint being received in and locked to the seat-side bearing plate; and a ring-like rod guide provided to the vehicle body-side bearing plate for the rod to pass through.

13 Claims, 10 Drawing Sheets

(56) References Cited

U.S. PATENT DOCUMENTS

| | | | |
|---|---|---|---|
| 2006/0220285 A1* | 10/2006 | Urquidi et al. | 267/140.12 |
| 2008/0246249 A1* | 10/2008 | Pokrywka | 280/283 |
| 2009/0261641 A1* | 10/2009 | Dickie | 297/314 |
| 2010/0187870 A1* | 7/2010 | Mackenroth | 297/209 |
| 2011/0049776 A1* | 3/2011 | Gustavsson | 267/140.11 |
| 2012/0235014 A1* | 9/2012 | Li | 248/636 |
| 2012/0306249 A1* | 12/2012 | Jung | 297/313 |

* cited by examiner

SEAT DAMPER

CROSS-REFERENCES TO RELATED APPLICATIONS

This application claims the benefit of Japan Patent Application No. 2012-146451 filed on Jun. 29, 2012 with the Japanese Patent Office, the entire contents of which are hereby incorporated by reference, in the entirety.

TECHNICAL FIELD

The present invention relates to a seat damper, and more particularly to a seat damper interposed between the vehicle body of a two-wheeled vehicle or the like and the seat for absorbing shock and vibration transmitted to the seat from the vehicle body.

BACKGROUND

As shown in Laid-open Japanese Utility Model Applications No. S53-3395 and S53-4521, seat suspension structures for two-wheeled vehicles or the like are conventionally known, which use a seat damper interposed between a one-seater seat for the driver to sit on and the vehicle body to provide a cushion, so as to absorb shock and vibration transmitted to the driver from the vehicle body via the seat. The seat is mounted to the vehicle body such as to be fixed at the front end with a hinge mechanism while allowing its rear side to deflect in the up and down direction. The seat includes a U-shaped seat bracket, which is a mounting part for securing a seat damper to the backside of the seat. A mounting part formed by a pair of mounting pieces is provided on the vehicle body to attach the seat damper. The seat bracket and the mounting part of the vehicle body are arranged such that they are located on the same plane. The seat damper includes a tubular member, a rod coaxially provided to the tubular member to slide axially on the inner circumferential surface of the tubular member, and a compression spring. The compression spring is set to surround the rod and the tubular member and seated on the respective bearing plates on the outer circumferences of the tubular member and the rod. Mounting holes extending through the tubular member and the rod perpendicularly to their axes are formed in portions closer to ends than the respective bearing plates of the tubular member and the rod, and pins are inserted into the respective mounting holes as well as the seat bracket and the mounting part on the vehicle body side. The seat damper is thereby attached to the respective mounting parts of the seat bracket and the vehicle body to be rotatable with the strokes of the seat damper when the seat moves up and down. The seat is formed by covering a frame, which includes the seat mounting pieces and is provided with a foam material or the like, with skin or leather.

With the seat suspension structure shown in Japanese Utility Model Application Laid-open No. S53-3395 and S53-4521, however, the seat bracket for attaching the seat damper and the mounting part of the vehicle body need to be positioned accurately on the same plane. Since the distal end of the seat is fixed with a hinge mechanism while the rear end is rotatable up and down, the seat damper needs to be attached with pins as mentioned above so that it is rotatable relative to the seat bracket and the mounting part of the vehicle body to perform the stroke motion. That is, since the seat damper is coupled by inserting pins between itself and the seat bracket or the mounting part of the vehicle body, if the seat bracket and the mounting part of the vehicle body are not on the same plane, even if the pin may be inserted into one of the seat bracket and the mounting part of the vehicle body, it can not be inserted to the other. Even if the precision error is within a range that still allows forcible mounting, a force caused by such forcible mounting will act on the seat damper and may inhibit smooth stroke motion thereof, or may act laterally on the seat relative to the vehicle body at every stroke, which may inhibit the driver's control of the vehicle. Consequently the positioning of the seat bracket and the mounting part of the vehicle body for attaching the seat damper requires high accuracy and is an impediment to an improvement in production efficiency in the process step of attaching the seat damper. Also, the seat bracket and the mounting part of the vehicle body require sufficient rigidity in view of the need to keep the seat damper fixedly in position so that the stroke motion of the seat damper will be in a constant direction.

SUMMARY OF THE INVENTION

The present invention is made in view of these problems, and it is an object of the invention to provide a seat damper attached between a vehicle body and a seat in a seat suspension structure, the seat damper accomodating misalignment in mounting positions of mounting parts between the vehicle body side and the seat side, and being configured with reduced rigidity.

To solve the problems described above, the seat damper may be configured to include: a resilient member interposed between a vehicle body and a seat and resiliently supporting a load applied between the vehicle body and the seat; a seat-side bearing plate and a vehicle body-side bearing plate sandwiching the resilient member to receive a resilient force from the resilient member; a rod including a joint at one end of the rod, for pivotably coupling the rod to the seat-side bearing plate, the joint received in and locked to the seat-side bearing plate; and a locking portion at the other end of the rod, for locking the rod to a lower face of the vehicle body-side bearing plate; and a ring-like rod guide provided to the vehicle body-side bearing plate and including an inner circumferential surface, for allowing the rod to pass through the ring-like rod guide, the inner circumferential surface configured to be an arcuate in a cross section in such a manner that the arcate bulges from both ends to a middle position of the inner circumferential surface along an axial direction of the rod. The seat damper can thereby be mounted easily to the vehicle body without requiring assembly accuracy.

Namely, one end of the rod is coupled to the seat-side bearing plate via the joint, while the other end of the rod is passed through the rod guide provided in the vehicle body-side bearing plate, which rod guide includes an arcuate cross section so that its inner circumferential surface bulges more at a middle position than both ends in the axial direction of the rod. The rod can thereby tilt relative to the seat-side bearing plate and the rod guide, so that, when the seat-side bearing plate and the vehicle body-side bearing plate of the seat damper are attached to the vehicle body and the seat, respectively, even if the mounting parts of the vehicle body and the seat for attaching the seat damper are not located accurately, the seat damper can readily be fixed to the seat and the vehicle body, because the rod tilts relative to the seat-side bearing plate and the vehicle body-side bearing plate. Also, because of the rod being tiltable relative to the seat-side bearing plate and the vehicle body-side bearing plate as described above, the seat damper can move smoothly in strokes and so the stroke motion of the seat damper does not impede driver's control of the vehicle. The joint attached at one end of the rod only needs to be locked by a locking portion in the seat-side bearing plate, so the seat-side bearing plate and the joint can be assembled together without requiring a special tool.

DESCRIPTION OF THE EMBODIMENTS

Hereinafter, the present invention will be described in detail through illustration of embodiments of the invention. The following embodiments, however, are not to limit the invention according to the claims. All the combinations of the features described in the embodiments are not necessarily essential to the means of solution provided by the invention, and the invention includes other selectively employed configurations.

Figure 1:
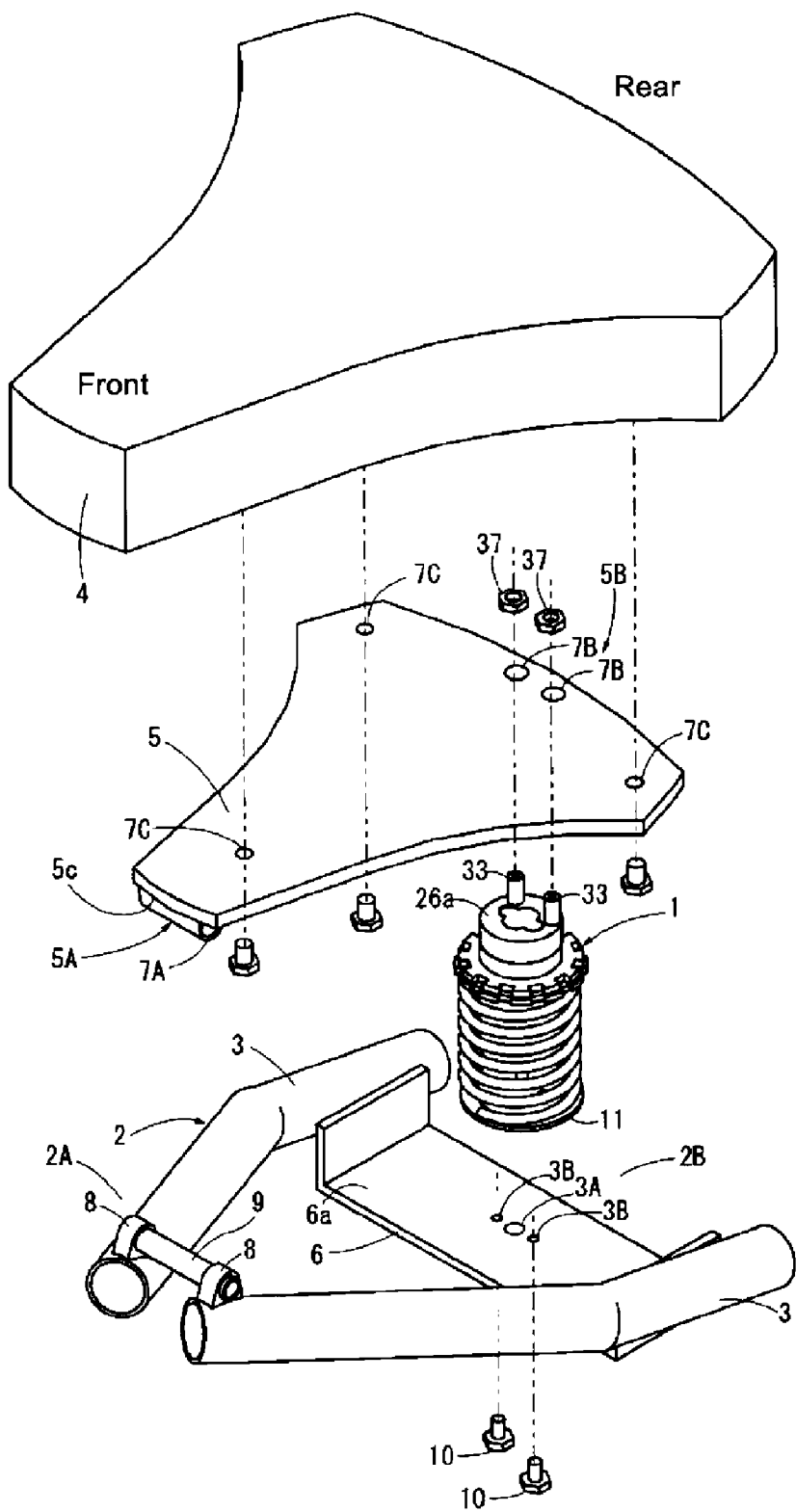
FIG. 1 is a schematic partially exploded perspective view illustrating one embodiment of a seat damper.

FIG. 1 is a diagram illustrating one embodiment of a seat damper according to the present invention.

As shown in the drawing, the seat damper 1 is interposed between a frame 2 located in an upper part of the vehicle body of a two-wheeled vehicle and a seat base 5 for securing a one-seater seat 4 so as to absorb shock and vibration transmitted from the road surface to the frame 2. The seat 4, which is referred to as "saddle", is wider in the rear and narrower in the front for a driver to mount easily.

The frame 2 includes a front mounting part 2A to which the front side of the seat base 5 is attached, and a rear mounting part 2B to which the seat base 5 is attached via the seat damper 1.

The front mounting part 2A is formed by cylindrical tubular members 8 each secured to each of frame pipes 3 extending in the front-back direction of the vehicle body on the left and right thereby forming the frame 2, by welding or the like. The tubular members 8 each include their axes oriented in the left-right direction of the vehicle body perpendicular to the front-back direction and are positioned on the frame pipes 3 coaxially and spaced away a certain distance from each other.

The rear mounting part 2B is formed as a plurality of holes in a plate-like bridge member 6 bridged between the frame pipes 3 to receive more weight of the driver and to allow attachment of the seat damper 1 in the center at the bottom thereof. The holes include an escape hole 3A for letting a rod 14 to be described later to pass through, and a plurality of mounting holes 3B for attaching the seat damper 1. The escape hole 3A is formed in a size that will allow passage of the rod 14 of the seat damper 1 to be described later, a washer 22, and a collision damper 21 in the center of the left-right direction of the vehicle body. The mounting holes 3B are formed to each open on the left and right of the escape hole 3A in the width direction of the vehicle body. The mounting holes 3B constitute a mounting part on the vehicle body side for attaching the seat damper 1.

The seat base 5 includes a front mounting part 5A that corresponds to the tubular members 8, and a rear mounting part 5B for securing the upper end of the seat damper 1 fixed with the use of the mounting holes 3B.

The front mounting part 5A is formed by a tubular member 7A including substantially the same length as the distance between the tubular members 8 and securely attached to the backside 5c of the seat base 5. The tubular member 7A is secured by welding or the like in the center at the front end of the seat base 5 with its axis oriented in the left-right direction. The seat base 5 is set on the frame 2 such that the tubular member 7A is coaxial with the tubular members 8 on the frame pipes 3, and a fixing pin 9 is inserted into the tubular members 7A and 8, so that the seat base 5 can turn about the front end as the pivot to allow its rear end to move up and down.

The rear mounting part 5B is formed as a plurality of mounting through holes 7B extending through the seat base 5 in the thickness direction at its rear end. The mounting through holes 7B are spaced apart a certain distance in the left-right direction corresponding to fixing bolts 33 on the seat damper 1. This seat base 5 includes a plurality of through holes 7C for securing the seat 4, with bolts passed through the through holes 7C as shown, to secure the seat 4.

Figure 2:
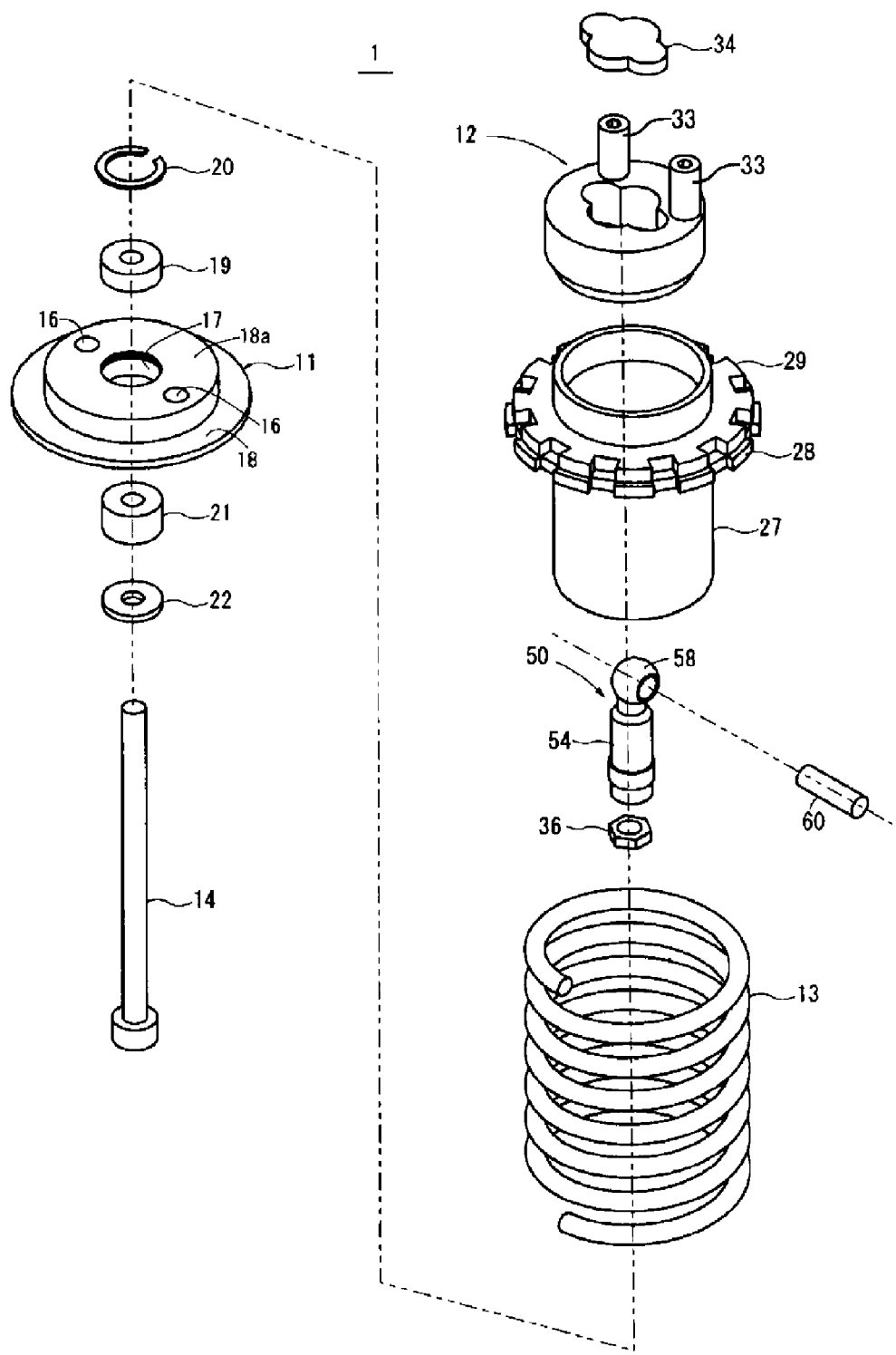
FIG. 2 is an exploded perspective view of the seat damper.
Figure 3:
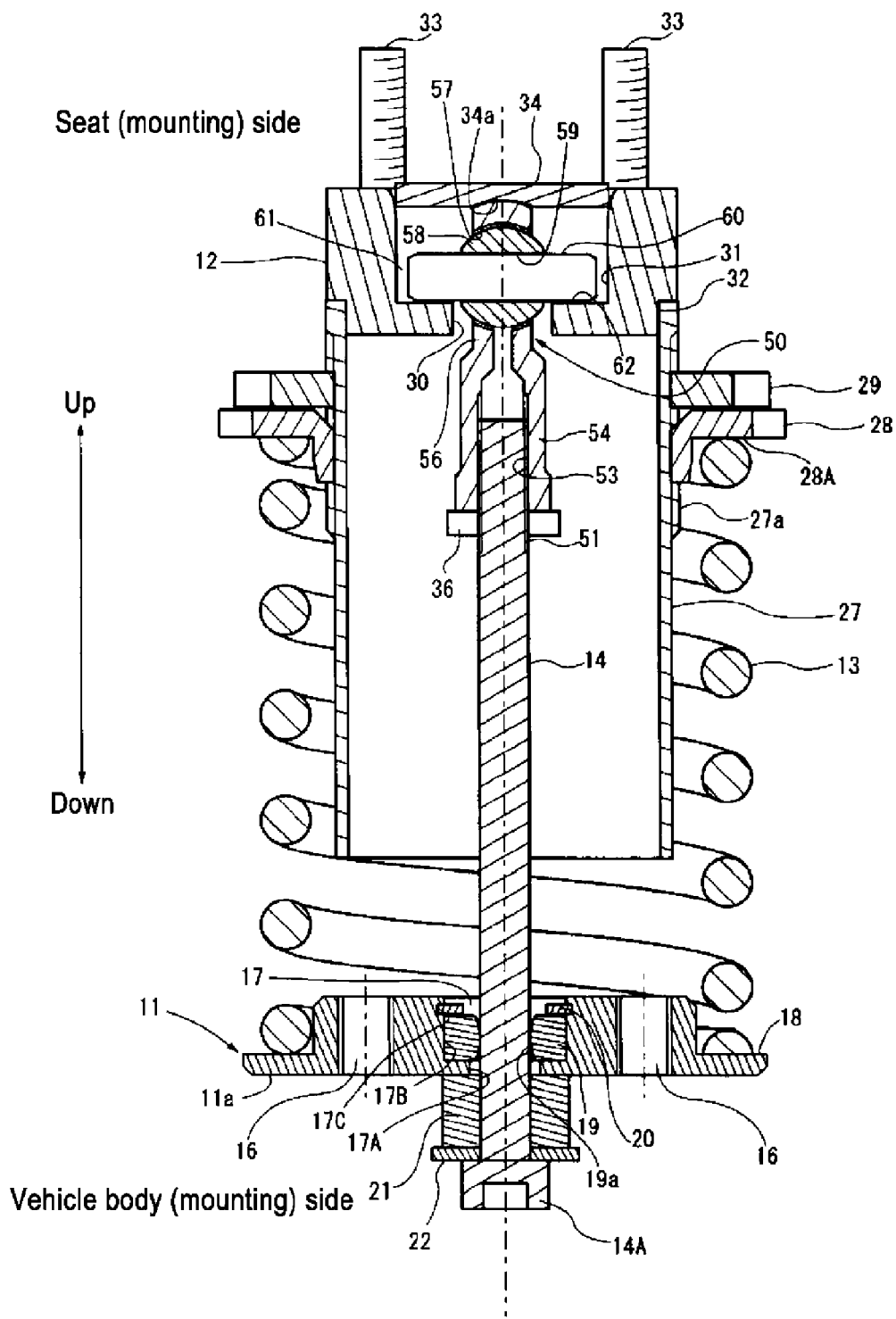
FIG. 3 is an assembled cross-sectional view of the seat damper.

FIG. 2 is an exploded perspective view of the seat damper 1 according to the present invention, and FIG. 3 is an assembled cross-sectional view of the seat damper 1.

As shown in FIG. 2 and FIG. 3, the seat damper 1 includes a vehicle body-side bearing plate 11 and a seat-side bearing plate 12 opposite each other in the up and down direction, a coil spring 13, and the rod 14. The vehicle body-side bearing plate 11 includes a ring-like protrusion 18a, a flange-like seating surface 18 to receive the lower end of the metal (stainless steel) coil spring (hereinafter, "spring") 13 that serves as a resilient member for absorbing shock and vibration, mounting holes 16 for securing the seat damper 1 to the vehicle body, and a rod through hole 17 for the rod 14 extending up and down to pass through. The spring 13 is a so-called compression spring, which may be linear or non-linear, or a combination of linear or non-linear compression springs arranged in series.

The mounting holes 16 are formed as a plurality of screw holes extending in the sheet thickness direction at positions corresponding to the mounting through holes 3B of the frame 2. Bolts 10 are passed through the mounting holes 3B from the under side of the bridge member 6 shown in FIG. 1 and screwed into the mounting holes 16, so as to securely attach the vehicle body-side bearing plate 11, with the lower face 11a of the vehicle body-side bearing plate 11 making surface contact with the upper face 6a of the bridge member 6. The bridge member is set such that, when the vehicle body-side bearing plate 11 is secured to the bridge member 6, the seat damper 1 will be at an optimal mounting angle inclined in the front-back direction relative to the seat base 5.

As the bridge member 6 and the vehicle body-side bearing plate 11 make surface contact with each other, they can enhance each other's strength, so that the bridge member 6, which is the vehicle body-side mounting part 2B, will include sufficient rigidity when the vehicle body-side bearing plate 11 is attached, even though the bridge member 6 itself may only include a certain rigidity necessary for the attachment of the two parts.

Figure 4:
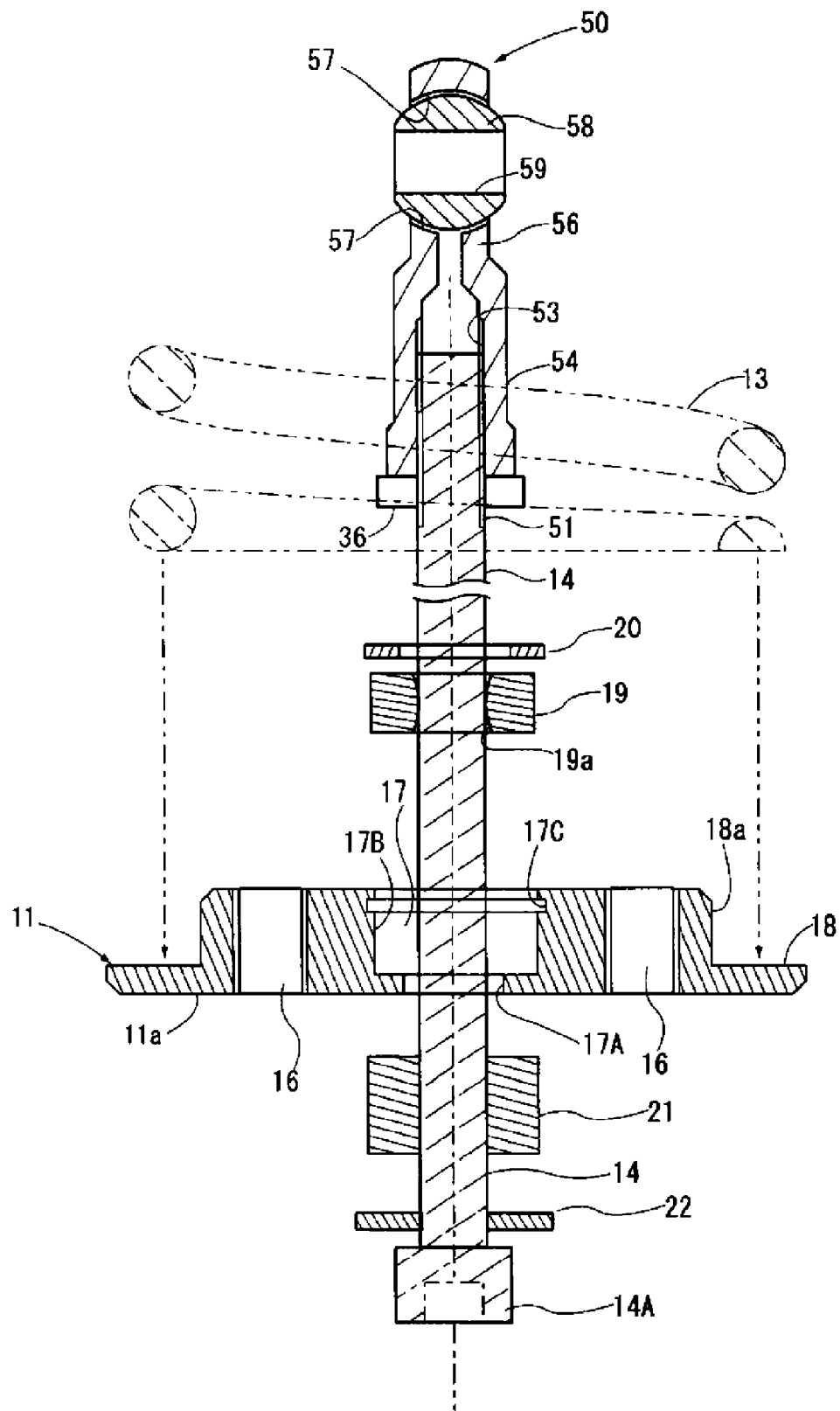
FIG. 4 is a partial enlarged view of a vehicle body-side bearing plate.

The rod through hole 17 extends through the center of the vehicle body-side bearing plate 11 in the thickness direction as shown in the enlarged view of FIG. 4, and is formed in a step-like shape as the receiving hole for receiving a rod guide 19. More specifically, the rod through hole 17 includes a rod passing portion 17A through which the rod 14 passes, a rod guide receiving portion 17B where the rod guide 19 is set, and a retainer ring groove 17C where a retainer ring 20 is set for securing the rod guide 19. The rod through hole 17 coincides with the escape hole 3A in the bridge member 6 when the seat damper 1 is attached to the frame 2.

The rod passing portion 17A opens to the lower face 11a that comes into contact with the bridge member 6 and has a diameter larger than the outer diameter of the rod 14. More specifically, the rod passing portion 17A is so dimensioned that the rod 14 will not come into contact with it when the rod 14 is inclined with respect to the vehicle body-side bearing plate 11 (see FIG. 4).

The rod guide receiving portion 17B is a cylindrical hole with a larger diameter than that of the rod passing portion 17A thereabove, located in vicinity of the center in the sheet thickness direction, and coaxial with the rod passing portion 17A. The ring-like rod guide 19 is set in this rod guide receiving portion 17B for the rod 14 to pass through.

Figure 5:
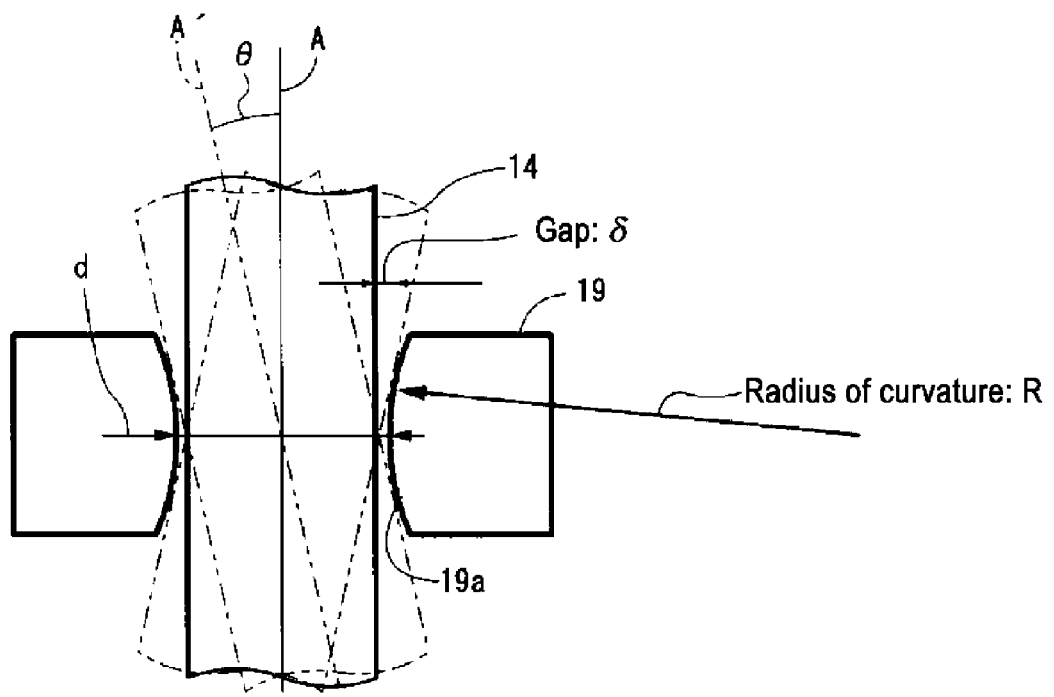
FIG. 5 is an enlarged view of a rod guide.

The rod guide 19 is a cylindrical guide member including an inner circumferential surface 19a that allows the rod 14 to slide up and down, and to pivot back and forth, and left to right with respect to the vehicle body-side bearing plate 11. As shown in FIG. 4 and FIG. 5, the inner circumferential surface 19a is bulged in the center in the up and down direction toward the center axis of the rod guide 19 and includes an arcuate cross-sectional shape. More specifically, the rod guide 19 is formed to include a smallest inner diameter in a central portion in the up and down direction or the thickness direction of the rod guide 19, with the diameter increasing gradually to both sides in the thickness direction, such that the cross section is arcuate. The smallest inner diameter d of the inner circumferential surface 19a has a predetermined gap δ between the surfaces of the rod 14 and the rod guide 19. More specifically, the smallest inner diameter d of the inner circumferential surface 19a of the rod guide 19 is set to a size obtained by adding two times the gap δ to the diameter of the rod 14, when the rod 17 vertically extends through the rod guide 19. The radius of curvature R and the gap δ mentioned above determine the range of the pivot angle θ of the rod 14 with respect to the vehicle body-side bearing plate 11, as shown in FIG. 5. In FIG. 5, A denotes the axial center of the rod 14, while A' indicates the axial center of the rod 14 inclined with respect to the vehicle body-side bearing plate 11.

The radius of curvature R and the gap δ mentioned above can be set based on a maximum pivot angle θ. The maximum pivot angle is determined for example based on the movable range of the seat base 5 when the seat damper 1 is attached to the frame 2 and the seat base 5.

The angle is determined by a circular arc having a radius of curvature R that allows the outer circumferential surface of the rod 14 to touch the inner circumferential surface of the rod guide 19 as the rod 14 is gradually inclined from perpendicular relative to the rod guide 19 to the maximum angle.

More specifically, when the rod 14 is inclined from a position perpendicular to the rod guide 19, the outer circumferential surface of the rod 14 moves in the same direction as the inclining rod 14 within a radial plane containing the center position in the thickness direction of the rod guide 19. Therefore, the inner diameter d at the center position in the thickness direction of the rod guide 19 needs to include a size obtained by adding twice the length of the distance that the outer circumferential surface of the rod 14 moves until reaching a maximum angle, to the outer diameter of the rod 14.

Therefore, the radius of curvature R may be set such that the circular arc passes through a point where the outer circumferential surface of the rod 14 is located in the radial plane containing the center position of the rod guide 19 when the maximum angle is reached, and that the rod guide 19 will contact the outer circumferential surface of the rod 14 as the rod is gradually inclined from the position perpendicular with respect to the rock guide 19 to the maximum angle.

The gap δ equals the distance that the outer circumferential surface of the rod 14 moves from the position perpendicular to the rod guide 19 to the maximum angle within a radial plane containing the center position in the thickness direction of the rod guide 19. By setting such a gap δ when the rod 14 is perpendicular to the rod guide 19, the distance between the inner circumferential surface of the rod guide 19 and the outer circumferential surface of the rod 14 can be set to a necessary minimum. Accordingly, the gap can be set to minute, and at the same time the rod 14 is allowed not only to slide up and down but to pivot with respect to the rod guide 19. By separating the inner circumferential surface 19a of the rod guide 19 from the outer circumferential surface of the shaft of the rod 14 with the fine gap having the predetermined size, the rod 14 is allowed to incline with respect to the rod guide 19, and at the same time the looseness of the rod 14 with respect to the rod guide 19 can be minimized. The "fine gap" here is not only a gap allowing the rod 14 to slide axially with respect to the rock guide 19, but also a gap configured to allow the rod 14 to take a predetermined pivot angle with respect to the rod guide 19. Thus, as the inner circumferential surface 19a of the rod guide 19 is separated from the outer circumferential surface of the rod 14 by a fine gap having a predetermined size, the rod 14 is allowed not only to slide along the axis thereof with respect to the inner circumferential surface 19a of the rod guide 19, but also to pivot with respect to the rod guide 19.

The method of setting the radius of curvature R described above is one example and the radius of curvature R can be set by other methods. The method of setting the gap δ is not limited to the one described above. The size of gap δ may be set larger, and limits thereof may be set so that the pivot angle of the rod 14 will be within a permissible range.

This rod guide 19 may be formed, for example, of a material containing a solid lubricant such as a fluoride resin or the like, to enable smooth sliding between the inner circumferential surface 19a and the rod 14.

As the inner circumferential surface 19a of the rod guide 19 includes an inner diameter set such that the rod 14 extends therethrough with a gap δ between the rod 14 and the rod guide 19, and is formed to include an arcuate cross section, the rod 14, when it declines with respect to the vehicle body-side bearing plate 11, can do so along the smooth curved surface of the inner circumferential surface 19a having an arcuate cross-sectional shape. Accordingly, the rod 14 can sway back and forth and left and right smoothly with respect to the vehicle body-side bearing plate 11. Namely, as contact area between the rod 14 and the inner circumferential surface 19a of the rod guide 19 in the up and down direction is small, the rod 14 can sway in the front-back, and left-right directions more easily.

The retainer ring groove 17C is a groove provided slightly above the upper end face of the rod guide 19 set in the rod guide receiving portion 17B with a larger diameter than that of the rod guide receiving portion 17B. The C-shaped retainer ring 20 is set in this groove to restrict axial movement of the rod guide 19.

With the vehicle body-side bearing plate 11 configured as described above, when the vehicle body-side bearing plate 11 inclines with respect to the rod 14, the gap δ formed around the inner circumferential surface 19a of the rod guide 19 and the arcuate shape allow the rod 14 to incline as shown in FIG.

5, and also allow the stroke motion while the rod 14 keeps this inclined state with respect to the vehicle body-side bearing plate 11.

The seating surface 18 is a portion with a reduced sheet thickness around the outer rim of the vehicle body-side bearing plate 11 so that the cross section is L-shaped between itself and the thick portion in the center. The circumferential surface defining the boundary between the seating surface and the protrusion 18a has an outer diameter that is smaller than the inner diameter of the spring 13 and set so as to prevent misalignment of the spring 13 relative to the vehicle body-side bearing plate 11.

The rod 14 extending through the rod guide 19 is a shaft member with a constant thickness and a length that is predetermined in consideration of the stroke amount of the seat damper 1. The rod includes a locking portion 14A at the lower end formed to have a larger diameter than the outer diameter of the rod itself, and a male thread portion 51 on the outer circumferential surface at the other end. A commercially available hexagonal bolt or a bolt with a hexagonal bore, for example, may be employed as the rod 14. In this case, the bolt head corresponds to the locking portion 14A, and the thread portion corresponds to the male thread portion 51.

The locking portion 14A locks the rod substantially to the lower face 11a of the vehicle body-side bearing plate 11, formed to have a size that does not allow it to pass through the rod passing portion 17A when the rod 14 is passed through the vehicle body-side bearing plate 11 via the rod guide 19. Between this locking portion 14A and the vehicle body-side bearing plate 11 are interposed the collision damper 21 and the washer 22. The collision damper 21 is for example a ring-like rubber member with a predetermined thickness having resiliency for the rod 14 to pass through. The washer 22 has a larger outer diameter than that of the collision damper 21 and a slightly larger inner diameter than the outer diameter of the rod 14. The washer 22 is interposed between the collision damper 21 and the locking portion 14A to restrict deformation of the collision damper 21 and to prevent the collision damper 21 from coming off of the locking portion 14A. Namely, the locking portion 14A engages with the vehicle body-side bearing plate 11 with the washer 22 and the collision damper 21 interposed therebetween.

Accordingly, when the contracted seat damper 1 under a load tries to return to the initial length by the restoring force of the spring 13 or when it fully extends, the impact of the locking portion 14A colliding against the vehicle body-side bearing plate 11 is absorbed by the collision damper 21, whereby generation of abnormal noise is prevented.

Next, the structure of the upper part of the rod 14, i.e., how the upper part of the rod 14 and the seat-side bearing plate 12 are connected via a joint 50 will be described.

Figure 6:
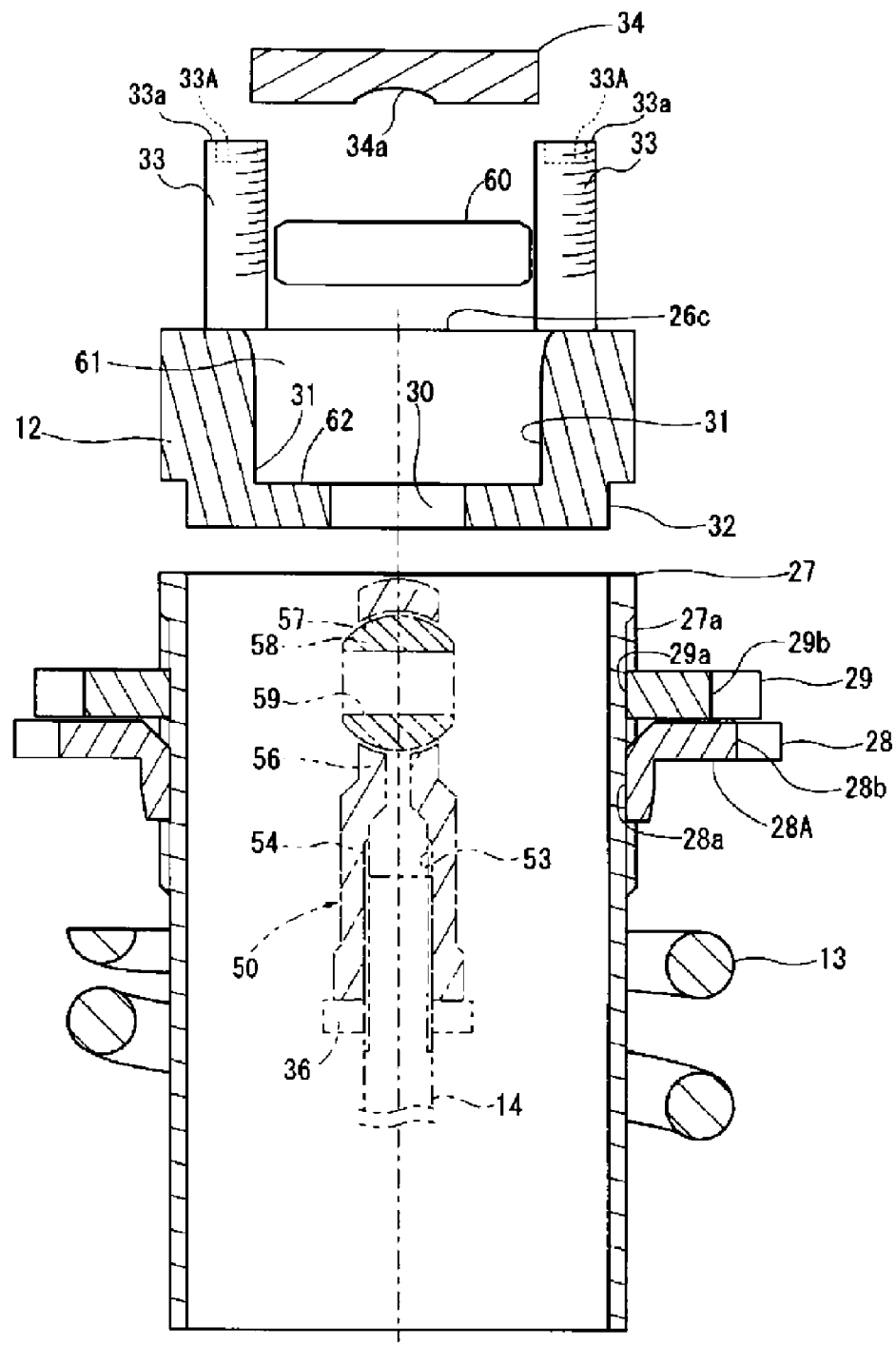
FIG. 6 is a partial enlarged view of a seat-side bearing plate.
Figure 7:
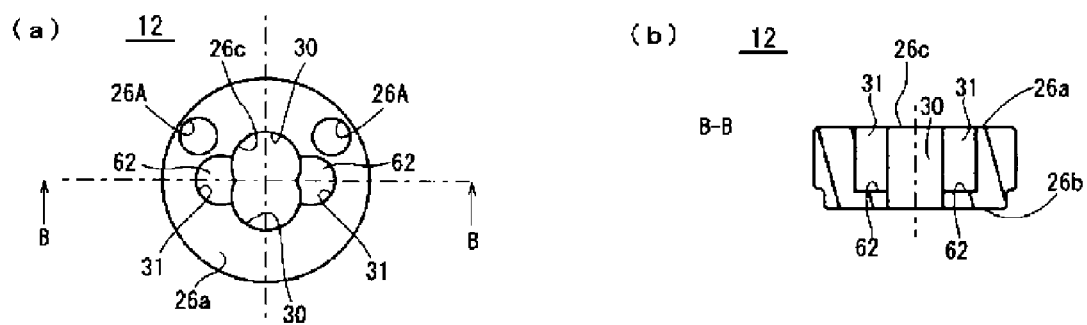
FIG. 7A is an upper plan view and FIG. 7B is a cross-sectional view of a rod fixing part.

The joint 50 is received inside the seat-side bearing plate 12 as shown in FIG. 6, FIG. 7A, and FIG. 7B, and includes a tubular member 54 including a female thread portion 53 in which the male thread portion 51 at the distal end of the rod 14 is screwed, a small diameter portion 56 formed at the top of the tubular member 54 to extend through the through hole 30 in the seat-side bearing plate 12 in the up and down direction without touching it, a hollow spherical receptacle 57 formed in the upper part of the small diameter portion 56 to extend therethrough in the left-right direction, a spherical member 58 enclosed in the spherical receptacle 57, and a locking pin 60 fitted in a through hole 59 extending in the left-right direction of this spherical member 58 with both ends protruding on the left and right from the spherical member 58. The joint 50 is fixed to the distal end of the rod 14 by fastening a fastening nut 36 to the tubular member 54.

The locking pin 60 is received in a hollow part 61 of the columnar seat-side bearing plate 12 in the left-right direction (lateral orientation), and sits on the upward facing bottom surface (ground surface) 62 of the seat-side bearing plate 12 to restrict upward movement of the seat-side bearing plate 12. Portions facing both side faces of the locking pin 60 inside the hollow part 61 form locking portions 31.

In this embodiment, the spherical receptacle 57 includes upper and lower surfaces curved with the diameter increasing in the center axis direction, and encloses therein the spherical member 58 including spherical surfaces at the top and the bottom with about the same radius of curvature as that of the upper and lower surfaces of the spherical receptacle 57. Thus, the sliding contact between the spherical receptacle 57 and the spherical member 58 forming the joint 50 allows the pivoting movement of the rod 14 and the seat-side bearing plate 12 in the front-back and left-right directions. The seat-side bearing plate 12 undergoes various vertical and tilting movements in the front-back and left-right directions in accordance with the rider's weight and braking, acceleration and driving in curves to the left or right during the drive. The joint 50 of this embodiment enables the seat-side bearing plate 12 to freely tilt so that the seat 4 can tilt so as to match the rider's best driving conditions.

A spherical plain bearing, for example, such as a so-called pillow ball joint, may be employed as the joint 50.

The through hole 30 extends through the seat-side bearing plate 12 in the up and down direction. The through hole can be readily formed by drilling two connecting holes through the bearing plate as shown in FIG. 7A and FIG. 7B with the use of a drill having a larger diameter than the maximum thickness of the joint 50.

The locking portions 31 are formed as dents continuous with the through hole 30 in a direction orthogonal to the direction in which the two adjacent holes of the through hole 30 are arranged. The locking portions 31 are each formed, for example, as holes with a predetermined depth on both sides and continuous with the through hole 30 on the line passing through a center of the two overlapping circular holes of the through hole 30 in a direction orthogonal to the direction in which the circular holes are arranged. The locking portions 31 may be readily formed by machining to form the flat bottom surface 62, below the locking portion 31, which will be in contact with the locking pin 60, for example, by drilling the holes with the use of an end mill including a larger diameter than that of the locking pin 60.

With the through hole 30 and the locking portions 31 being formed, there is formed an opening 26c in the upper face 26a of the seat-side bearing plate 12. A cap 34 is fitted to this opening 26c. The cap 34 is a rubber material formed in the shape to plug the opening 26c, for example, and includes an abutting surface 34a on the underside that will contact the outer circumferential surface of the spherical receptacle 57. The abutting surface 34a is formed in a recessed shape dented inwards so that, when the seat damper 1 is attached to the seat base 5 with the cap 34 fitted in the opening 26c, the abutting surface 34a fits on the outer circumferential surface of the spherical receptacle 57 that is the upper end of the joint 50 as the upper face of the cap 34 makes contact with the lower face 5c of the seat base 5. Thus, when the seat damper 1 is attached, the locking pin 60 engaging with the locking portions 31 of the seat-side bearing plate 12 is pressed against the bottom surface 62 of the locking portions 31 by the pressure from the cap 34, so that there is no looseness or misalignment of the locking pin 60 inside the locking portions 31.

The cap 34 maybe fixedly attached to a predetermined position on the lower face 5c of the seat base 5 beforehand with the use of fixing means (not shown), so that when the seat damper 1 is attached to the seat base 5, the cap 34 will fit into the opening 26c and the abutting surface 34a will contact the outer circumferential surface of the spherical receptacle 57.

Thus the rod 14 including the joint 50 configured as described above can rotate relative to the seat-side bearing plate 12 as the spherical receptacle 57 slides along the spherical surface of the spherical member 58 in which the locking pin 60 is fixed, and can pivot in the front-back or left-right direction or combinations of four directions.

The fitting portion 32 at the bottom periphery of the seat-side bearing plate 12 is fitted into the upper end of the cylindrical member 27 and fixedly attached by welding or the like, for example. While the cylindrical member 27 is securely attached to the seat-side bearing plate 12 here, the requirement is only to make the cylindrical member 27 and the seat-side bearing plate 12 unrotatable relative to each other after the cylindrical member 27 is fitted in the fitting portion 32 of the seat-side bearing plate 12. Therefore, for example, the fitting portion may include a protrusion protruding outward in the sheet thickness direction, and the cylindrical member 27 may include a recess corresponding to this protrusion, such as a dent, hole, or slot, so that the cylindrical member 27 may be fixed to the seat-side bearing plate 12 unrotatably, by engagement of the protrusion with the recess.

The cylindrical member 27 includes a thread portion 27a with a predetermined pitch on its outer circumferential surface. An adjusting ring 28, on which the upper end face of the spring 13 will sit, and a fixing ring 29 for fixing the adjusting ring 28 are screwed on this thread portion 27a.

The adjusting ring 28 includes a thread portion 28a on the inner circumferential surface to mate with the thread portion 27a of the cylindrical member 27, and a tool engagement portion 28b on the outer circumferential surface provided for rotating the adjusting ring 28 relative to the cylindrical member 27. The tool engagement portion 28b includes recesses and protrusions in the form of teeth around the rim of the adjusting ring 28 so that a hook-like tool can be hooked to a recess to rotate the adjusting ring 28 relative to the cylindrical member 27. A seating surface 28A is formed on the lower end face of the adjusting ring 28 to receive the upper end face of the spring 13.

The fixing ring 29 is an annular flat plate member provided on the cylindrical member 27 closer to the seat than the adjusting ring 28. The fixing ring 29 includes a slightly smaller outer diameter than that of the adjusting ring 28. The fixing ring 29 includes a thread portion 29a on the inner circumferential surface to mate with the thread portion 27a of the cylindrical member 27, and a tool engagement portion 29b similar to that of the adjusting ring 28 on the outer circumferential surface. Rotating this fixing ring 29 relative to the adjusting ring 28 in a fastening direction imparts a force to fix both the adjusting ring 28 and the fixing ring 29 on the cylindrical member 27, so that the adjusting ring 28 is prevented from rotating around the cylindrical member 27 during the drive due to vibration or the like.

Namely, the cylindrical member 27 secured to the seat-side bearing plate 12, adjusting ring 28, and fixing ring 29 constitute a preload adjusting mechanism for adjusting the preload to the spring 13 beforehand when the spring 13 is sandwiched between the seat-side bearing plate 12 and the vehicle body-side bearing plate 11. With such a preload adjusting mechanism for adjusting the preload to the spring 13 provided in the seat damper 1, the load carried by the spring 13 can be adjusted in accordance with the rider's weight. The preload may be reduced, for example, if the rider weighs lighter than a reference level, or may be increased, if the rider weighs heavier than the reference level. The preload may be adjusted also depending on whether the rider is riding a single vehicle or a tandem vehicle. While the preload adjusting mechanism is formed to the seat-side bearing plate 12 in this embodiment, the preload adjusting mechanism may be formed to the vehicle body-side bearing plate 11 in an alternative configuration.

Threaded rods are employed as the fixing bolts 33 in this embodiment. The fixing bolts 33 are screwed into the pair of screw holes 26A opened in the upper face 26a of the seat-side bearing plate 12 to form the seat-side mounting part of the seat damper 1. Threaded rods here refer to rods including no tool engagement part with a larger diameter than the treaded part on one end such as hexagonal bolts or bolts with hexagonal bores to allow use of a tool. In this embodiment, the fixing bolts 33 include a tool engagement part 33A including a smaller diameter than the thread diameter at one end. The tool engagement part 33A is formed as a hexagonal dent, for example, recessed from the end face 33a. The tool engagement part 33A need not necessarily be a hexagonal hole but may be a Phillips, minus, or hex lobe recess.

The pair of fixing bolts 33 are provided to the seat-side bearing plate 12, while matching mounting through holes 7B are formed in the seat base 5 so that, with the seat damper 1 attached to the seat base 5, when rotating the adjusting ring 28 around the cylindrical member 27 secured to the seat-side bearing plate 12 to adjust the preload to the spring 13, the seat-side bearing plate 12 and the cylindrical member 27 are prevented from rotating with the adjusting ring 28.

Figure 8:
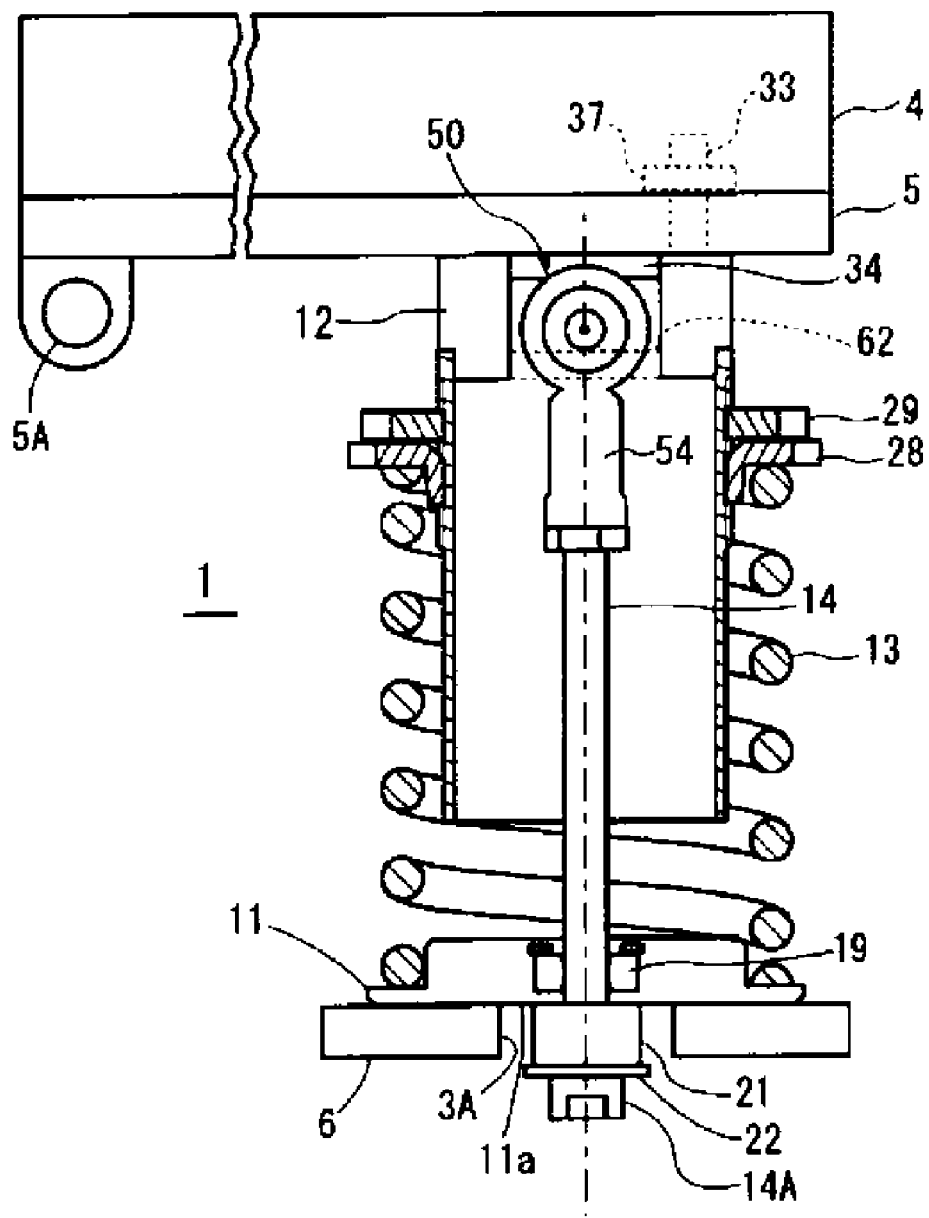
FIG. 8 is a diagram showing how the seat damper operates.
Figure 8:
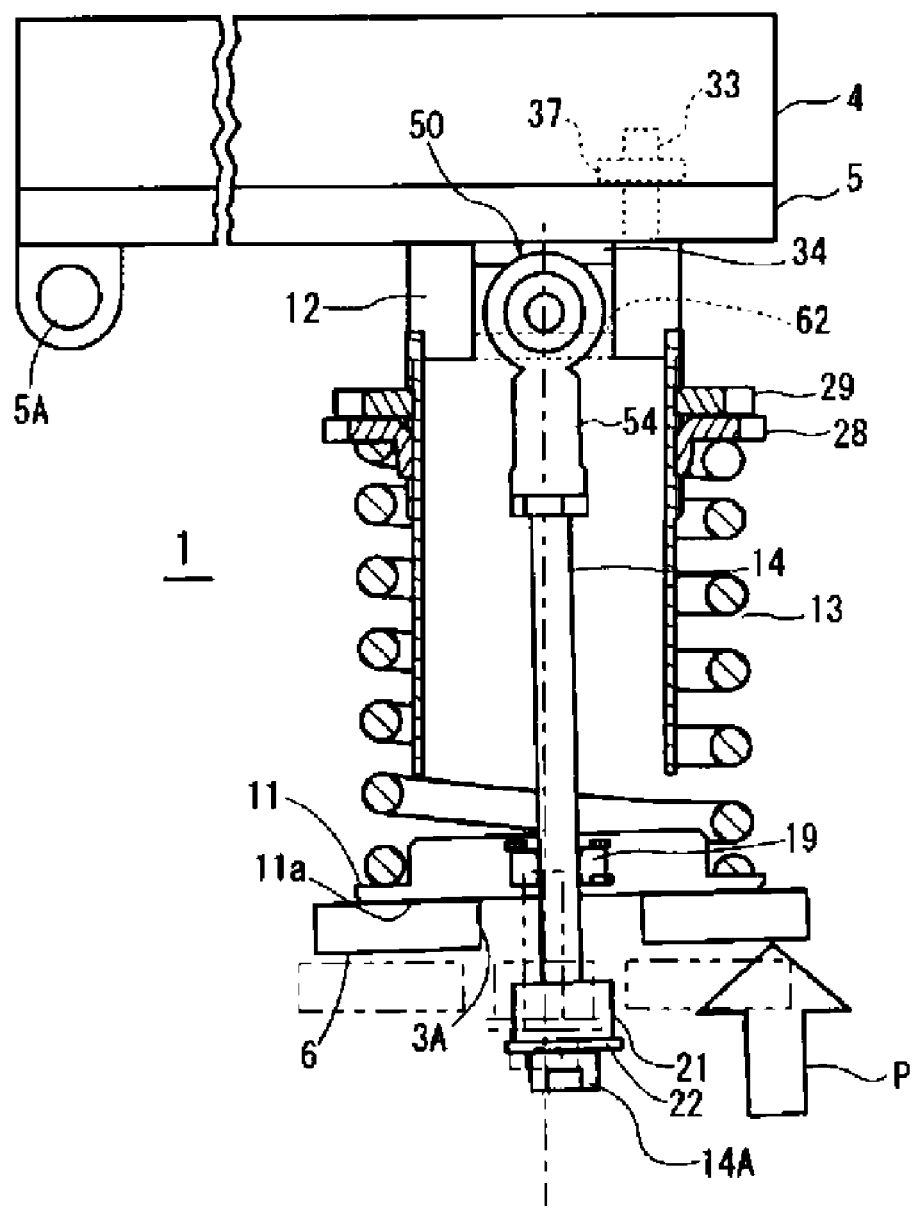

The seat damper 1 mounted on the vehicle body behaves during the drive as will be described below. FIG. 8A and FIG. 8B are diagrams illustrating the behaviors of the seat damper 1. FIG. 8A shows a condition in relation to the vehicle body and the seat when a driver is riding on the vehicle body. FIG. 8B shows a condition when a force is input from the road surface to the vehicle body.

The preload on the spring 13 is adjusted by turning the adjusting ring 28, which is the preload adjusting means, to adjust the distance to the vehicle body-side bearing plate 11 and by fastening the fixing ring 29 after that relative to the adjusting ring 28, so that the biasing force of the spring 13 in the seat damper 1 generally balances the weight of the driver when the driver mounts, as shown in FIG. 8A. This preload is set such that there is no looseness of the rod 14, with the collision damper 21 contacting the lower face 11a of the vehicle body-side bearing plate 11.

When input P such as shock or vibration is transmitted from the road surface to the vehicle body during the drive as shown in FIG. 8B, the spring 13 is compressed by the rider's weight and the input P. Then the rod 14 protrudes from the escape hole 3A in the bridge member 6 and the seat damper 1 strokes to absorb the input P. This stroke of the seat damper 1 imparts a rotating motion of the seat base 5 around the center shaft of the tubular member 7A, which is the front mounting part 5A of the seat base 5 to bring the rear mounting part 5B of the seat base 5 and the bridge member 6 closer to each other. Meanwhile, since the upper end and the lower end of the seat damper 1 are secured to the rear mounting part 5B of the seat base 5 and the bridge member 6 of the vehicle body, respectively, the stroke and or the rotating motion changes the mounting angle around the tubular member 7A between the rear mounting part 5B of the seat base 5 and the bridge member 6.

The change in the mounting angle between the rear mounting part 5B of the seat base 5 and the bridge member 6 is made possible by the rod 14 inclining relative to the seat-side bearing plate 12 that is the seat-side mounting part and the vehicle body-side bearing plate 11 that is the vehicle body-side mounting part, thus allowing the stroke motion.

Namely, the upper end of the rod 14 is pivotably supported in the seat-side bearing plate 12 which is fixed to the seat base 5, via the spherical plain bearing, while the lower end pivots, by tilting along the inner circumferential surface 19a of the rod guide 19 provided in the vehicle body-side bearing plate 11 and including an arcuate cross sectional shape, thereby allowing the angle between the rear mounting part 5B of the seat base 5 and the bridge member 6 to change, for example, in front-back or left-right direction.

When the seat damper 1 returns to its initial state shown in FIG. 8A after the stroke, the collision damper 21 makes contact with or collides against the lower face 11a of the vehicle body-side bearing plate 11 to prevent the locking portion 14A of the rod 14 from colliding the vehicle body-side bearing plate 11 so that generation of abnormal noise is prevented.

Assembly and mounting of the seat damper 1, according to the present invention, to the vehicle body will be described herebelow.

First, as shown in FIG. 2 to FIG. 4, the rod guide 19 is set in the rod guide receiving portion 17B formed in the vehicle body-side bearing plate 11. Next, the retainer ring 20 is fitted in the retainer ring groove 17c for securing the rod guide 19 so that it will not come off of the vehicle body-side bearing plate 11, to unite the rod guide 19 and the vehicle body-side bearing plate 11.

Next, the rod 14 is passed through the washer 22 and the collision damper 21 one after another from the distal end of the rod 14 to the locking portion 14A, after which the rod 14 is passed through the rod guide 19 in the vehicle body-side bearing plate 11 until the collision damper 21 contacts the lower face 11a of the vehicle body-side bearing plate 11.

Next, the joint 50 is screwed to the distal end of the rod 14 that protrudes from the vehicle body-side bearing plate 11, and the fastening nut 36 is fastened to the tubular member 54 of the joint 50 so as to secure the joint 50 to the rod 14.

Next, the spring 13 is seated on the seating surface 18 of the vehicle body-side bearing plate 11 from the distal end of the rod 14 to surround the outer circumferential surface of the rod 14.

Next, the assembling of the seat-side bearing plate 12 will be described. The cylindrical member 27 is fitted with the fitting portion 32 of the seat-side bearing plate 12, and the adjusting ring 28 and the fixing ring 29 are screwed on the thread portion 27a of the cylindrical member 27. For the assembly with the rod 14, the fixing ring 29 and the adjusting ring 28 are at this time located closer to the seat-side bearing plate 12 on the cylindrical member 27.

Next, from the distal end of the rod 14 relative to the previously assembled vehicle body-side bearing plate 11, the seat-side bearing plate 12 is placed over the rod 14, to bring the upper end of the spring 13 to sit on the seating surface 28A of the adjusting ring 28, with the cylindrical member 27 interposed in the space surrounded by the inner circumference of the spring 13, so that, as the seat-side bearing plate 12 compresses the spring 13, the joint 50 extends through the through hole 30 in the seat-side bearing plate 12. The spring 13 is compressed until the joint 50 is exposed above the upper face 26a of the seat-side bearing plate 12, and the locking pin 60 is inserted into the through hole 59 of the joint 50. Next, the spring 13 is freed from the compressing force so that the spring 13 presses the adjusting ring 28 upward and pushes up the seat-side bearing plate 12, and when both ends of the locking pin 60 make contact with the bottom surface 62 of the locking portions 31 in the seat-side bearing plate 12, the distal end of the rod 14 is locked to the seat-side bearing plate 12, whereby the vehicle body-side bearing plate 11, the seat-side bearing plate 12, and the spring 13 are united as the damper. The cap 34 is then fitted in the opening 26c opened in the upper face 26a of the seat-side bearing plate 12 to touch the upper end of the joint 50.

Lastly, the fixing bolts 33 are screwed into the screw holes 26A in the seat-side bearing plate 12, whereby the mounting part on the seat side of the seat damper 1 is complete.

Next, how the seat damper 1 is attached to the frame 2 and the seat base 5 will be described with reference to FIG. 1 to FIG. 3.

The seat damper 1 is attached to the frame 2 by fastening them together with bolts 10 passed through the mounting holes 16 in the vehicle body-side bearing plate 11 matched with the vehicle body-side mounting holes in the bridge member 6 provided to the frame 2. The fixing bolts 33 protruding from the seat-side bearing plate 12 are passed through the mounting through holes 7B in the seat base 5, and the nuts 37 are each screwed on the fixing bolts 33, so that the seat damper 1 is secured to the seat base 5.

Since the seat damper 1 is secured to the frame 2 with two bolts 10 through the mounting holes 16 in the vehicle body-side bearing plate 11, and to the seat base 5 with the two fixing bolts 33 standing on the seat-side bearing plate 12, the adjustment of the damping force of the spring 13 is made easy, which is done by adjusting the biasing force of the spring 13 with the adjusting ring 28, because the adjusting ring 28 is prevented from rotating with the seat-side bearing plate 12. While the vehicle body-side bearing plate 11 includes two mounting holes 16 so that the plate is attached to the frame 2 with two bolts 10 passed through the mounting holes 16, the invention is not limited to this. The effect described above can be achieved, too, if the vehicle body-side bearing plate 11 includes three, four, or any plural number of mounting holes and is attached to the frame 2 with matching mounting holes 3B. The number of fixing bolts 33 is not limited to the one described above, and the effect described above can be achieved by providing three, four, or any plural number of bolts on the seat-side bearing plate 12. In consideration of the productivity, however, in the process steps of assembling the seat damper 1 and of attaching the seat damper to the vehicle body, the number of the mounting holes 16 and the fixing bolts 33 should preferably be two to achieve the effect described above and to improve the productivity.

As described above, the seat damper 1 is secured such that the upper face 26a of the seat-side bearing plate 12 makes surface contact with the lower face 5c of the seat base 5 so that the seat base 5 and the seat-side bearing plate 12 are united and reinforce each other. Therefore, the rigidity of the mounting part on the seat side need not be taken into account as is necessary before. As the vehicle body-side bearing plate 11 is secured such as to make surface contact with the bridge member 6, the rigidity of the mounting part on the vehicle body side need not be taken into account as was necessary before.

While the present invention includes been described in terms of the embodiments, the technical scope of the present invention is not limited to the range described in the embodiments. A variety of changes and improvements can be made to the embodiments described above.

For example, while the resilient member for absorbing shock and vibration is described as a metal spring 13 in the embodiment above, a resilient member made of elastomer such as synthetic rubber may be employed as will be described later. In this case, the elastomer resilient member may be formed in a cylindrical shape that can sit on the seating surface 18 of the vehicle body-side bearing plate 11 and on the seating surface 28A of the seat-side bearing plate 12. If elastomer is used for the resilient member, cylindrical restricting means made of metal or resin, for example, that does not stretch radially, may be provided to restrict expansion of the outer circumferential surface of the resilient member, as it expands radially when it receives a load. With the restricting means, the load receiving direction can be restricted to one direction. With the use of an elastomer resilient member, the seat damper 1 can be made more lightweight. The resilient member may also be configured with an air spring.

While the collision damper 21 is described as being made of rubber, it may be made of resin or elastomer such as rubber including a constant thickness and formed in a cylindrical shape with a predetermined thickness, or may be formed by a metal spring.

Figure 9:
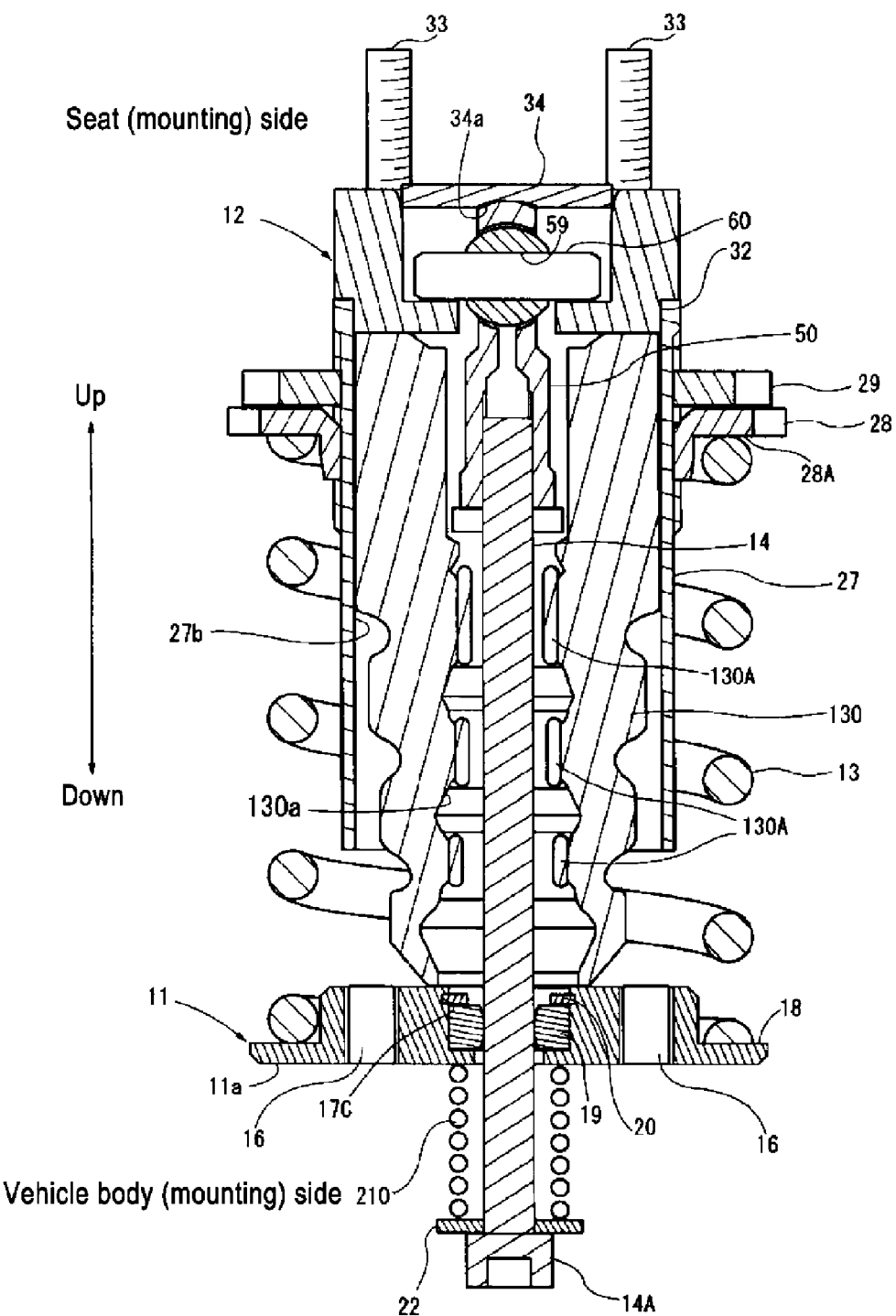
FIG. 9 is an assembled cross-sectional view illustrating another embodiment of the seat damper.

In another embodiment of the seat damper 1, for example, a bump rubber 130 made of elastomer may be provided as shown in FIG. 9 in addition to the metal spring 13 that is used as the resilient member in the previously described embodiment.

This configuration including both the metal spring 13 and the elastomer bump rubber 130 will be described below. This embodiment is different from the previous one in that the elastomer resilient member is added, and the collision damper 21 is a metal coil spring 210 instead of the rubber member. In the following description, the same elements as those in the previous embodiment are given the same reference numerals and will not be described in detail.

The bump rubber 130 is a tubular member made of, for example, urethane foam, which is an elastomer material, and formed in a cylindrical shape. The bump rubber 130 is arranged inside the cylindrical member 27 so as to surround the rod 14. Namely, the spring 13 and the bump rubber 130 are located concentrically inside the cylindrical member 27. The bump rubber 130 includes a length, for example, set such that the upper end thereof can touch the lower face 26b of the seat-side bearing plate 12 and the lower end thereof can touch the protrusion 18a of the vehicle body-side bearing plate 11 when the spring 13 is in its initial state, i.e., in its factory state before the preload is adjusted with the adjusting ring 28. The outer diameter of the bump rubber 130 is set so as to allow the bump rubber to touch the inner circumferential surface 27b of the cylindrical member 27 from the upper end contacting the seat-side bearing plate 12 to halfway, from where the diameter decreases gradually toward the lower end, the lower half of the bump rubber being in a bellows form. A plurality of radially inward protrusions 130A are formed on the inner circumferential surface 130a of the bump rubber 130. The protrusions 130A are located at several axially spaced apart positions, a plurality of them being formed at each axial position at circumferentially equally spaced positions on the inner circumferential surface of the bump rubber 130. The protrusions 130A each include a rectangular cross section and different sizes at respective axial positions. These protrusions 130A are provided for reducing abnormal noise such as chattering that may be generated when the bump rubber 130 extends and contracts. The inner diameter of the bump rubber 130 is set such that the inner circumferential surface 130a does not touch either of the joint 50 and the rod 14.

The coil spring 210 is a so-called compression spring.

With the bump rubber 130 thus configured, when the seat damper 1 strokes, the bump rubber is compressed axially by the vehicle body-side bearing plate 11 and the seat-side bearing plate 12 and its outer circumferential surface tries to bulge out, but the inner circumferential surface 27b of the cylindrical member 27 restricts this bulging force, whereby a predetermined resilient force in the axial direction is achieved. Namely, the cylindrical member 27 forms restricting means of the bump rubber 130.

Therefore, since the load characteristics of the seat damper 1 are defined by a combination of the load characteristics achieved by the spring 13 and those achieved by the bump rubber 130, the load characteristics settings can be readily changed by changing the respective load characteristics of the spring 13 and the bump rubber 130. It is also possible to adjust the load characteristics of the spring 13 and the bump rubber 130 by adjusting their lengths between the seat-side bearing plate 12 and the vehicle body-side bearing plate 11 by means of a preload adjusting mechanism.

While the bump rubber 130 includes a length set to allow the upper end thereof to touch the seat-side bearing plate 12 and the lower end thereof to touch the protrusion 18a of the vehicle body-side bearing plate 11 when the spring 13 is in its initial state, the invention is not limited to this. The length may be set such that the bump rubber does not touch the vehicle body-side bearing plate 11 in the initial state, so that the lower end will touch the protrusion 18a of the vehicle body-side bearing plate 11, for example, somewhere halfway the stroke. With the bump rubber 130 thus configured, the load is received by the spring 13 alone at the start of the stroke, and then received by both the spring and the bump rubber 130 from halfway, i.e., the load characteristics can be changed during the stroke motion.

In this case, a preload adjusting mechanism for the bump rubber 130 may be provided to the vehicle body-side bearing plate 11 so that the preload can be independently adjusted in the initial state of the spring 13 and the bump rubber 130.

The elastomer forming the resilient member may be selected suitably from natural rubbers, synthetic rubbers, and other materials including rubber-like resiliency at normal temperature. Synthetic resin is preferable in terms of the types and functions. Examples of synthetic rubber include diene rubbers that contain a double bond and non-butadiene based rubbers that do not. Examples of diene rubbers include isoprene rubber, butadiene rubber, styrene/butadiene rubber, chloroprene rubber, acrylonitrile butadiene rubber, etc. Examples of non-butadiene based rubbers include butyl rubber, ethylene/propylene rubber, urethane rubber, silicone rubber, chlorosulphonated rubber, chlorinated polyethylene, acrylic rubber, epichlorohydrin rubber, fluorine rubber, etc. While the elastomer maybe selected in accordance with the purpose of use, it is practical in the present invention to use urethane rubber from the viewpoints of shock absorption and support stability.

In both embodiments described above, the cap 34 is abutted on the upper end of the spherical receptacle 57 that is the upper end of the joint 50 to press the seat-side bearing plate 12. Alternatively, for example, if the seat damper 1 is directly attached to the seat 4 without using the seat base 5, the cap 34 may be omitted and the joint 50 may be pressed by the seat 4. Generally, a damping material such as urethane is used for the seat to achieve a cushion property of the seat itself and this damping material is exposed except for the part where the seat damper is attached. The damping material of the seat will be pressed downward when the driver sits on the seat, whereby the seat will contact the spherical receptacle 57 of the seat damper, so that the same effects as the embodiments described above can be achieved.

While the rod 14 is described as including the locking portion 14A, the rod 14 may not necessarily include the locking portion 14A if it can be set longer than the natural lengths of the spring 13 or bump rubber 130 that are the resilient member. More specifically, the locking portion 14A is not necessary if the rod 14 can be made long enough so that it will not come off of the vehicle body-side bearing plate 11 when the seat 4 turns maximally around the front mounting part due to vibration or shock during the drive. With such a configuration, the assembling and mounting of the seat damper 1 to the vehicle body can be made easy. In this case, the collision damper 21 and the washer 22 are not necessary.

The seat damper is applied to a two-wheeled vehicle as an example in the embodiment described above where it is interposed between the seat and the frame (vehicle body). The invention is not limited to two-wheeled vehicles, and may be applied to other vehicles driven by a person mounting thereon, including three-wheeled vehicles, all terrain vehicles (ATVs or four-wheeled buggies), snow mobiles, jet skies, or four-wheeled vehicles such as agricultural vehicles or trucks.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the present invention include such modifications and variations as come with the scope of the appended claims and their equivalents.

What is claimed is:

1. A seat damper comprising:
   a resilient member interposed between a vehicle body and a seat and resiliently supporting a load applied between the vehicle body and the seat;
   a seat-side bearing plate and a vehicle body-side bearing plate sandwiching the resilient member to receive a resilient force from the resilient member;
   a rod including
      a joint at one end of the rod, for pivotably coupling the rod to the seat-side bearing plate, the joint received in and locked to the seat-side bearing plate; and
      a locking portion at the other end of the rod, for locking the rod to a lower face of the vehicle body-side bearing plate; and
   a ring shaped rod guide provided to the vehicle body-side bearing plate and including an inner circumferential surface, for allowing the rod to pass through the ring shaped rod guide, the inner circumferential surface configured to have an arcuate cross section in such a manner that the arcuate cross section bulges from both ends to a middle position of the inner circumferential surface along an axial direction of the rod.

2. The seat damper according to claim 1, wherein the joint includes a spherical receptacle coupled to one end of the rod, a spherical member enclosed in the spherical receptacle, and a locking pin fitted in the spherical member, and wherein the locking pin is locked inside the seat-side bearing plate and an upper end of the joint is abutted on a cap provided in the seat-side bearing plate.

3. The seat damper according to claim 1, wherein a collision damper is interposed between the lower face of the vehicle body-side bearing plate and the locking portion.

4. The seat damper according to claim 1, wherein the resilient member is a coil spring, and at least one of the seat-side bearing plate and the vehicle body-side bearing plate includes a preload adjusting mechanism adjusting a preload applied to the coil spring.

5. The seat damper according to claim 1, wherein the resilient member is made of elastomer, and the seat damper further comprises restricting means surrounding an outer circumference of the resilient member.

6. The seat damper according to claim 1, wherein the resilient member includes a coil spring resilient member and a cylindrical elastomer resilient member, the coil spring resilient member and the elastomer resilient member arranged concentrically between the seat-side bearing plate and the vehicle body-side bearing plate, and wherein the seat damper further comprises restricting means surrounding an outer circumference of the elastomer resilient member, and wherein at least one of the seat-side bearing plate and the vehicle body-side bearing plate includes a preload adjusting mechanism adjusting a preload applied to the resilient members.

7. The seat damper according to claim 2, wherein a collision damper is interposed between the lower face of the vehicle body-side bearing plate and the locking portion.

8. The seat damper according to claim 2, wherein the resilient member is a coil spring, and at least one of the seat-side bearing plate and the vehicle body-side bearing plate includes a preload adjusting mechanism adjusting a preload applied to the coil spring.

9. The seat damper according to claim 3, wherein the resilient member is a coil spring, and at least one of the seat-side bearing plate and the vehicle body-side bearing plate includes a preload adjusting mechanism adjusting a preload applied to the coil spring.

10. The seat damper according to claim 2, wherein the resilient member is made of elastomer, and the seat damper further comprises restricting means surrounding an outer circumference of the resilient member.

11. The seat damper according to claim 3, wherein the resilient member is made of elastomer, and the seat damper further comprises restricting means surrounding an outer circumference of the resilient member.

12. The seat damper according to claim 2, wherein the resilient member includes a coil spring resilient member and a cylindrical elastomer resilient member, the coil spring resilient member and the elastomer resilient member arranged concentrically between the seat-side bearing plate and the vehicle body-side bearing plate, and wherein the seat damper further comprises restricting means surrounding an outer circumference of the elastomer resilient member, and wherein at least one of the seat-side bearing plate and the vehicle body-side bearing plate includes a preload adjusting mechanism adjusting a preload applied to the resilient members.

13. The seat damper according to claim 3, wherein the resilient member includes a coil spring resilient member and a cylindrical elastomer resilient member, the coil spring resilient member and the elastomer resilient member arranged concentrically between the seat-side bearing plate and the vehicle body-side bearing plate, and wherein the seat damper further comprises restricting means surrounding an outer circumference of the elastomer resilient member, and wherein at least one of the seat-side bearing plate and the vehicle body-side bearing plate includes a preload adjusting mechanism adjusting a preload applied to the resilient members.

* * * * *